US00RE34099E

United States Patent [19]

Krounbi et al.

[11] E Patent Number: Re. 34,099

[45] Reissued Date of Patent: Oct. 13, 1992

[54] MAGNETORESISTIVE READ TRANSDUCER WITH INSULATOR DEFINED TRACKWIDTH

[75] Inventors: Mohamad T. Krounbi, San Jose; Gerald G. Lopatin, Los Gatos; Arthur L. Thayer, Jr., San Jose, all of Calif.

[73] Assignee: International Business Machines Corporation, Armonk, N.Y.

[21] Appl. No.: 682,501

[22] Filed: Apr. 8, 1991

Related U.S. Patent Documents

Reissue of:

[64] Patent No.: 4,782,414
Issued: Nov. 1, 1988
Appl. No.: 78,739
Filed: Jul. 28, 1987

[51] Int. Cl.[5] ..... G11B 5/127
[52] U.S. Cl. ..... 360/113
[58] Field of Search ..... 360/113; 338/32 R; 324/252

[56] References Cited

U.S. PATENT DOCUMENTS 3,987,485 10/1976 Sugaya et al. ..... 360/113 X
4,673,999 6/1987 Suyama et al. ..... 360/125

FOREIGN PATENT DOCUMENTS 0082224 5/1982 Japan ..... 360/113
0000612 1/1985 Japan ..... 360/113

*Primary Examiner*—Andrew L. Sniezek
*Attorney, Agent, or Firm*—Henry E. Otto, Jr.

[57] ABSTRACT

A magnetoresistive (MR) read head in which an insulator layer defines the effective track width over which the read head is sensitive. The insulator layer is deposited or patterned to extend a predetermined distance over the MR element, and the predetermined distance is chosen equal to the desired track width. Conductor leads are deposited in contact with the regions of the MR element not covered by the insulator layer with the conductor leads extending up to, and possibly overlapping, the edges of the insulator layer so that the read signal is sensed over the length of the MR element covered by the insulator layer.

6 Claims, 2 Drawing Sheets

MAGNETORESISTIVE READ TRANSDUCER WITH INSULATOR DEFINED TRACKWIDTH

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

Numerous prior art MR sensors have been developed, and these prior art MR sensors have been effective to meet prior art requirements. However, the drive toward increased recording density has led to the requirement for narrower recording tracks and increased linear recording density along the tracks. The small MR sensors which are necessary to meet these requirements cannot be made with the use of the prior art techniques.

Japanese published unexamined patent application No. 57-198528 describes a MR head in which the MR element is separated from a magnetic biasing layer by an insulating layer. However, the track width Tw, over which the head is responsive to magnetic excitation, is determined by the physical spacing between signal pickup conductors.

U.S. Pat. No. 4,504,880 to Church et al discloses an integrated magnetic recording head which includes an inductive write head and an MR read element. The MR read element is in electrical contact with the two spaced conductors, so the effective track width of the MR read element is defined by the spacing between these conductors.

U.S. Pat. No. 4,568,906 to DeWilde et al shows a magnetic field sensitive element suitable for measuring magnetic field gradients in which the active part of the magnetic field sensitive element is defined by connection conductors which are in electrical contact with the magnetic field sensitive element.

As the track width becomes smaller it becomes progressively more difficult to adequately define the track width by the distance between spaced conductor elements. No prior art is known in which the track width of a small MR sensor is defined by a patterned insulator layer in contact with the MR sensor and over whose edges the conductor leads are deposited so that the insulator layer defines the track width.

SUMMARY OF THE INVENTION

It is therefore the principal object of this invention to provide a small MR sensor in which the trackwidth is defined by a patterned insulator layer in contact with the MR sensor.

In accordance with the invention, the objective is achieved by a magnetoresistive (MR) read transducer comprising an MR element having passive regions separated by an active region. A layer of insulating material is provided in contact with the active region of the MR element, and the layer of insulating material has edges extending toward the passive regions of the MR element. First and second spaced conductor means are provided each being in electrical contact with one of the end regions of the MR element and extending to contact one of the edges of the insulating material so that, upon connection of the conductor means to a signal sensing means, the signal sensing means determines the resistance changes in the MR element as a function of the magnetic fields which are intercepted by the MR element over an effective track width defined by the distance between the edges of the layer of insulating material.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
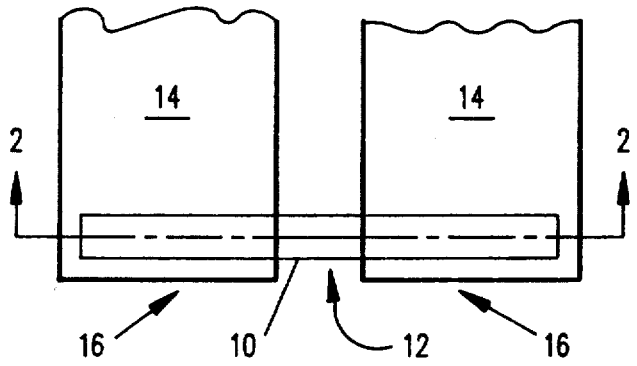
PRIOR ART FIG. 1
FIG. 1 is a plan view of a prior art magnetoresistive sensor.
Figure 2:
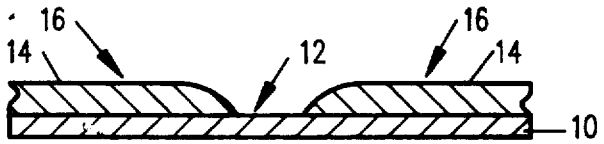
PRIOR ART FIG. 2
FIG. 2 is a section view taken along line 2—2 of FIG. 1.

A typical prior art magnetoresistive (MR) sensor is shown in FIGS. 1 and 2 to illustrate the problem to which the present invention is directed. The MR element 10 is deposited on a suitable substrate (not shown), and the assembly may also have one or more bias layers and/or nonmagnetic layers (not shown). The active region 12 of the MR element 10 is the central area that is not covered by electrically conductive leads 14, and the active region produces an MR output signal in response to magnetic excitation. The conductive leads 14 electrically short the area of the MR element 10 that they cover thereby rendering it magnetoresistively inactive. The area of the MR sensor covered by the conductive leads 14 produces little output in response to magnetic excitation so these areas define passive regions 16.

The prior art MR sensors depend on the accuracy of placement of the conductive leads 14 to define the active region 12 and therefore the effective trackwidth for the sensor. As the MR sensors have become smaller, the physical tolerance on the placement accuracy of the conductive leads becomes a proportionately larger percentage of the trackwidth. An additional uncertainty which introduces an additional problem of trackwidth definition and control is the edge profile of the conductive leads. The tapered edges of the conductive leads cause a problem in the definition of the active region and hence the effective trackwidth.

The MR sensor structure of the present invention provides greatly improved trackwidth definition and control. In the embodiment of the invention shown in FIGS. 3–6 of the drawings, the MR element 20 has an insulating layer 22 between the MR element 20 and the conductive leads 24. This new insulating layer defines the effective trackwidth so that the geometry of the conductive leads 24 is no longer important.

The insulating layer 22 may comprise either a dielectric material or a high resistivity material. So long as the resistivity of the material is sufficiently high to cause the great majority of the current to flow through the MR element 20, then the material may be used for the track defining layer 22.

Figure 3:
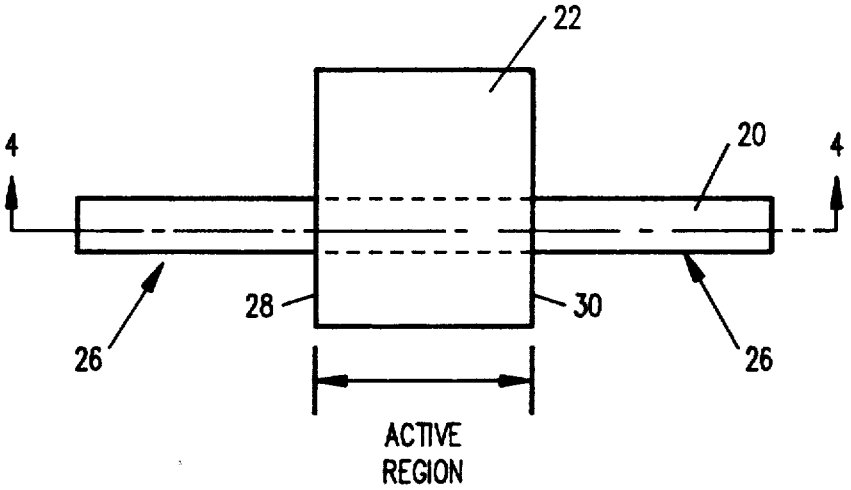
FIG. 3 is a plan view of the magnetoresistive sensor, prior to lead deposition, according to the present invention.
Figure 4:
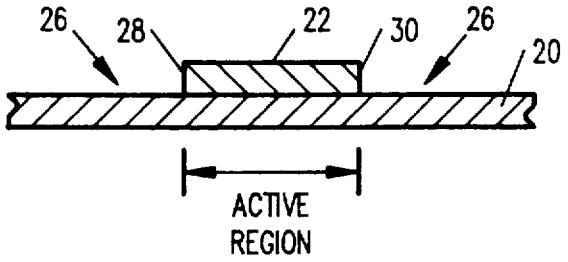
FIG. 4 is a section view taken along lines 4—4 of FIG. 3.
Figure 5:
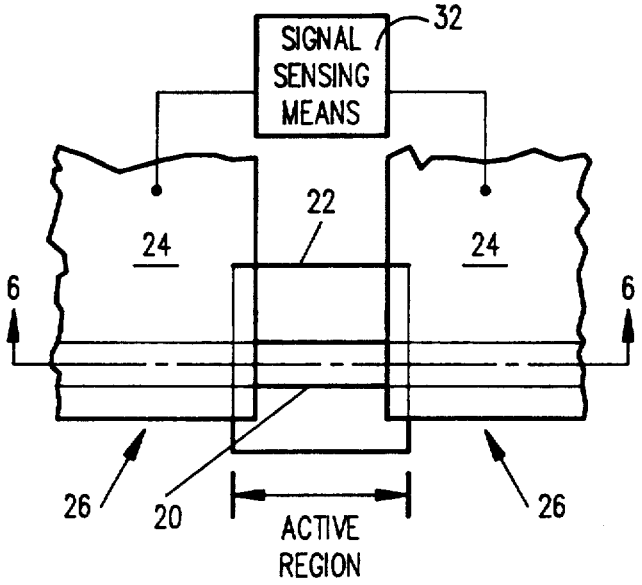
FIG. 5 is a plan view of *an apparatus, according to the invention, including* the magnetoresistive sensor, after lead deposition, [according to the present invention] *and a signal sensing means for sensing the signal from the sensor.*

The track defining insulating layer 22 is preferably deposited as a full film covering the entire MR element 20, and subtractively etched to form a layer having a predetermined width as shown in FIGS. 3 and 4. The etching process exposes the areas of the MR element 20 that are to be the passive regions 26, and the predetermined width measured between edges 28 and 30 defines the active region. The predetermined width can therefore be chosen equal to the desired trackwidth. The conductive leads 24 are then fabricated on top of the insulating layer 22 (FIGS. 5 and 6), so that intimate contact is made between the lead 24 and the area of the MR element 20 from which the insulator has been removed and so that each lead 24 extends to contact one of the edges 28 or 30 of the insulating layer 22. The lack of contact between leads 24 and MR element 20 caused by the insulating layer 22 defines the active region, or the electrical trackwidth, which is defined by the current path available through the conductive leads 24.

Figure 6:
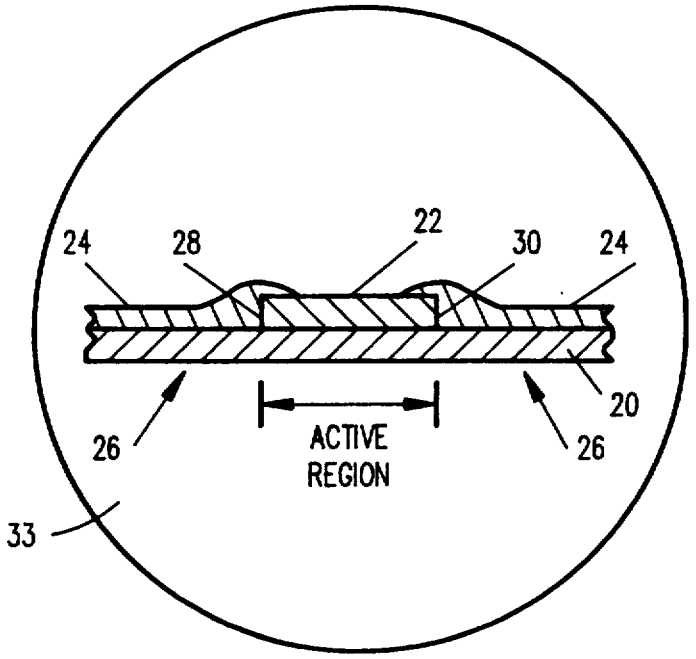
FIG. 6 is a section view taken along lines 6—6 of FIG. 5.

Upon connection of the conductor leads 24 to a signal sensing means 32 (FIG. 5), the signal sensing means 32 determines the resistance changes in MR element 10 as a function of the magnetic fields *sensed from an underlying magnetic medium 33 (shown to drastically reduced scale in FIG. 6)* which are intercepted by the MR element 10 over [and] *an* effective track width defined by the distance between the edges 28 and 30 of the layer of insulating material 22. In this embodiment the geometry of the conductive leads 24 is not important, and, so long as they are not shorted, their dimensions are not constrained. Note that the tapered edges of the conductive leads 24, as shown in FIG. 6, has no bearing on the trackwidth definition.

In practice, the insulating layer 22 can be a true insulator, such as sputtered alumina, or a high resistivity material, such as tantalum. Since the layer is preferably deposited as a full film and then subtractively etched, the material must be capable of being selectively etched without any adverse impact on the MR element 20 or any other components of the structure. Therefore, the major considerations for materials selection for insulating layer 22 are dielectric strength, resistivity (higher resistivity being better), and etch control. In a specific embodiment, a layer about 1000 angstroms thick of sputtered alumina was chosen since it has sufficient dielectric strength, can be selectively etched with excellent control, and is compatible with other components of the assembly.

As stated above, this invention removes the need for the conductive leads to have well-controlled geometries. This relaxation expands the techniques that can be used for lead fabrication. For example, lift-off using a bilayer method can be used since the tapered edges no longer cause concern with track definition. The taper simply extends on top of the insulating layer as shown in FIG. 6. Since the insulating layer acts also as a protective layer to the MR element, other lead fabrication techniques are now possible. One technique now possible is defining the leads by subtractive ion milling, since the insulating layer has sufficient etch resistance to protect the MR element. Chemical processes such as electrodepositing the leads can now be used, since the MR element is protected from damage during subsequent sputter etching to remove the plating base seed layer.

While the invention has been particularly shown and described with reference to a preferred embodiment thereof, it will be understood by those skilled in the art that various other changes in the form and details may be made therein without departing from the spirit and scope of the invention.

Having thus described our Invention, what we claim as new, and desire to secure by Letters Patent is:

1. A magnetoresistive read transducer comprising:

an elongated magnetoresistive element having passive end regions separated by an active region;

a layer of insulating material in contact with and extending across only said active region of said magnetoresistive element having a predetermined width, terminating in first and second edges, each of said edges extending toward one of the passive regions of said magnetoresistive element;

first and second spaced conductor means each being in electrical contact with a respective end region of said magnetoresistive element extending to contact one of said edges of said layer of insulating material and having a portion which overlaps said layer of insulating material whereby, upon connection of said conductor means to a signal sensing means, said signal sensing means determines the resistance changes in said magnetoresistive element as a function of the fields which are intercepted by said magnetoresistive element over an effective track width defined by said predermined width of said layer of insulating material.

2. The magnetoresistive read transducer of claim 1 wherein said layer of insulating material comprises alumina.

3. The magnetoresistive read transducer of claim 2 wherein said layer of insulating material is about 1000 angstroms thick.

4. The magnetoresistive read transducer of claim 1 wherein said layer of insulating material comprises a high resistivity material.

5. The magnetoresistive read transducer of claim 4 wherein said layer of insulating material comprises tantalum.

*6. In an apparatus for reading magnetic data from a magnetic medium having magnetic fields representing information signals, the combination of:*

*a magnetoresistive read transducer, the transducer comprising:*

*an elongated magnetoresistive element having passive end regions separated by an active region;*

*a layer of insulating material in contact with and extending across only said active region of said magnetoresistive element having a predetermined width, terminating in first and second edges, each of said*

*edges extending toward one of the passive regions of said magnetoresistive element;*

*first and second spaced conductor means each being in electrical contact with a respective end region of said magnetoresistive element extending to contact one of said edges of said layer of insulating material and having a portion which overlaps said layer of insulating material; and*

*a signal sensing means connected to said conductor means for determining the resistance changes in said magnetoresistive element as a function of the fields which are intercepted by said magnetoresistive element over an effective track width on the magnetic medium defined by said predetermined width of said layer of insulating material.*

* * * * *